(12) United States Patent
Adams et al.

(10) Patent No.: US 9,490,491 B2
(45) Date of Patent: Nov. 8, 2016

(54) SEPARABLE FUEL CARTRIDGE

(71) Applicant: Intelligent Energy Limited, Loughborough (GB)

(72) Inventors: Paul Adams, Monroe, CT (US); Andrew J. Curello, Hamden, CT (US); Constance R. Stepan, Oxford, CT (US); Hung T. Than, Rockville, MD (US)

(73) Assignee: Intelligent Energy Limited, Loughborough (GB)

( * ) Notice: Subject to any disclaimer, the term of this patent is extended or adjusted under 35 U.S.C. 154(b) by 706 days.

(21) Appl. No.: 13/796,682

(22) Filed: Mar. 12, 2013

(65) Prior Publication Data

US 2013/0189601 A1    Jul. 25, 2013

Related U.S. Application Data

(62) Division of application No. 11/996,042, filed as application No. PCT/US2006/027318 on Jul. 14, 2006, now abandoned.

(60) Provisional application No. 60/699,854, filed on Jul. 18, 2005.

(51) Int. Cl.
*H01M 8/04*  (2016.01)

(52) U.S. Cl.
CPC ..... *H01M 8/04201* (2013.01); *H01M 8/04208* (2013.01); *Y02E 60/50* (2013.01); *Y10T 137/1654* (2015.04)

(58) Field of Classification Search
CPC .......... H01M 2250/30; H01M 8/04201; H01M 8/04208; H01M 2008/1095; H01M 2250/20
See application file for complete search history.

(56) References Cited

U.S. PATENT DOCUMENTS

| | | | |
|---|---|---|---|
| 4,483,359 A | 11/1984 | Robertson | |
| 4,950,914 A * | 8/1990 | Kurihara | B60R 21/0132 180/274 |
| 5,256,335 A * | 10/1993 | Byrd | C08K 7/06 252/500 |
| 5,415,043 A * | 5/1995 | Zabler | B81B 3/0051 216/39 |
| 5,456,027 A | 10/1995 | Tecchio et al. | |

(Continued)

FOREIGN PATENT DOCUMENTS

| | | |
|---|---|---|
| JP | S 62-062765 | 3/1987 |
| JP | 2002-373688 A | 12/2002 |

(Continued)

OTHER PUBLICATIONS

Translation of JP 2005-71713.

(Continued)

*Primary Examiner* — Basia Ridley
*Assistant Examiner* — Heng Chan
(74) *Attorney, Agent, or Firm* — Baker & Hostetler LLP

(57) ABSTRACT

A fuel supply (10) is attachable to a fuel cell system (12). The fuel supply includes a fuel supply connector (14) configured to be attached to the fuel cell system. A fuel supply connector automatically separates the fuel supply from the fuel cell system in a predetermined manner if exposed to a separation load. Valves (24, 26) or filler material (23*a-d*) are used to automatically stop the flow of fuel through the fuel supply connector. Alternatively, the fuel supply connector includes a flexible tube (114) and a valve disposed within the connector. The flexibility of the tube prevents the connector from breaking in case of a separation load.

10 Claims, 10 Drawing Sheets

(56) References Cited

U.S. PATENT DOCUMENTS

| | | |
|---|---|---|
| 5,730,169 A | 3/1998 | Adams |
| 5,791,366 A | 8/1998 | Lo |
| 5,982,573 A | 11/1999 | Henze |
| 6,131,445 A | 10/2000 | Kundrot et al. |
| 6,321,769 B2 | 11/2001 | Ostroski et al. |
| 6,447,945 B1 | 9/2002 | Streckert et al. |
| 6,536,551 B1 * | 3/2003 | Tanaka .................. B60K 28/14 180/271 |
| 7,055,640 B2 | 6/2006 | Cook |
| 7,318,327 B2 | 1/2008 | Dickerson et al. |
| 7,762,278 B2 | 7/2010 | Adams et al. |
| 2001/0050189 A1 * | 12/2001 | Shimizu ................ B60L 3/0015 180/65.29 |
| 2003/0136453 A1 | 7/2003 | Johnson et al. |
| 2004/0076783 A1 | 4/2004 | Norman et al. |
| 2004/0241521 A1 * | 12/2004 | Finkelshtain ..... H01M 8/04208 429/454 |
| 2005/0022883 A1 | 2/2005 | Adams et al. |
| 2005/0023236 A1 | 2/2005 | Adams et al. |
| 2005/0031916 A1 | 2/2005 | Ozeki |
| 2005/0115637 A1 | 6/2005 | Adams et al. |
| 2005/0147864 A1 | 7/2005 | Eggum |

FOREIGN PATENT DOCUMENTS

| | | | |
|---|---|---|---|
| JP | 2003042363 A | * | 2/2003 |
| JP | 2003-211982 A | | 7/2003 |
| JP | 2005-071713 A | | 3/2005 |
| WO | WO 02/06774 A2 | | 1/2002 |

OTHER PUBLICATIONS

Translation of JP 2003-211982.
Translation of JP S62-62765.
European Search Report, issued in connection with corresponding European Patent Application No. 06787255.6 on Aug. 6, 2009.
International Search Report and Written Opinion issued in connection with parent application PCT/US2006/027318 on Feb. 6, 2007.
Allan, Roger. "Accelerometer Offers Economical Low-G Sensing." Electronic Design. pp. 38 and 40. May 12, 2005.

* cited by examiner

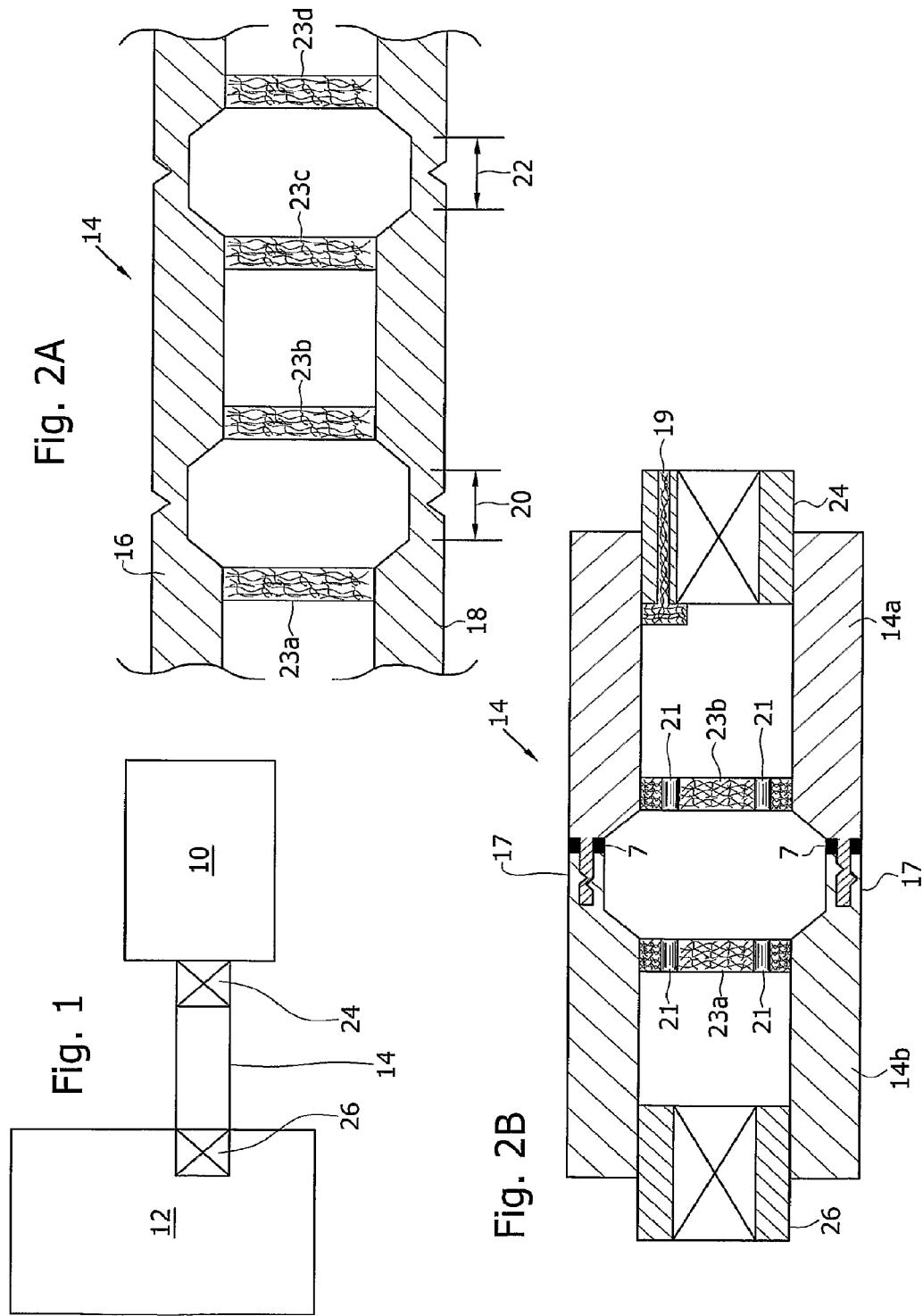

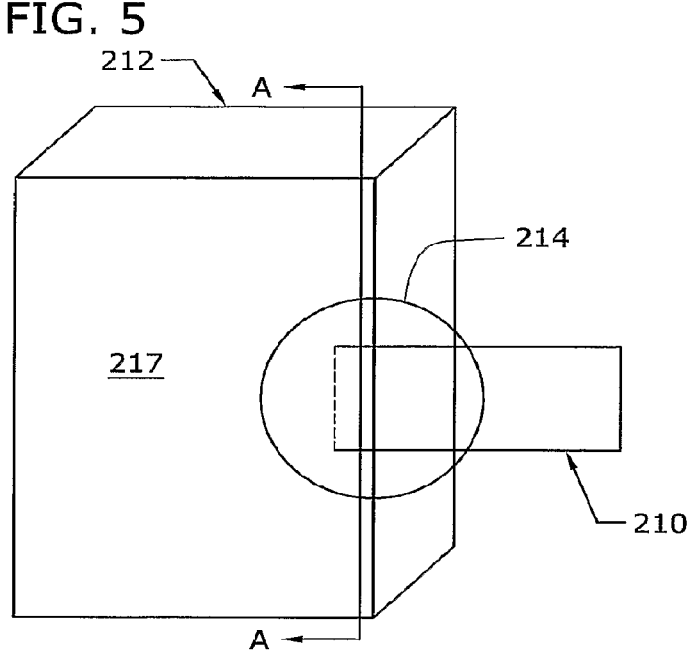
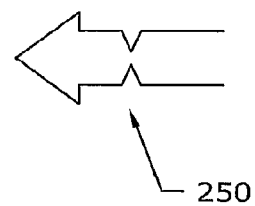
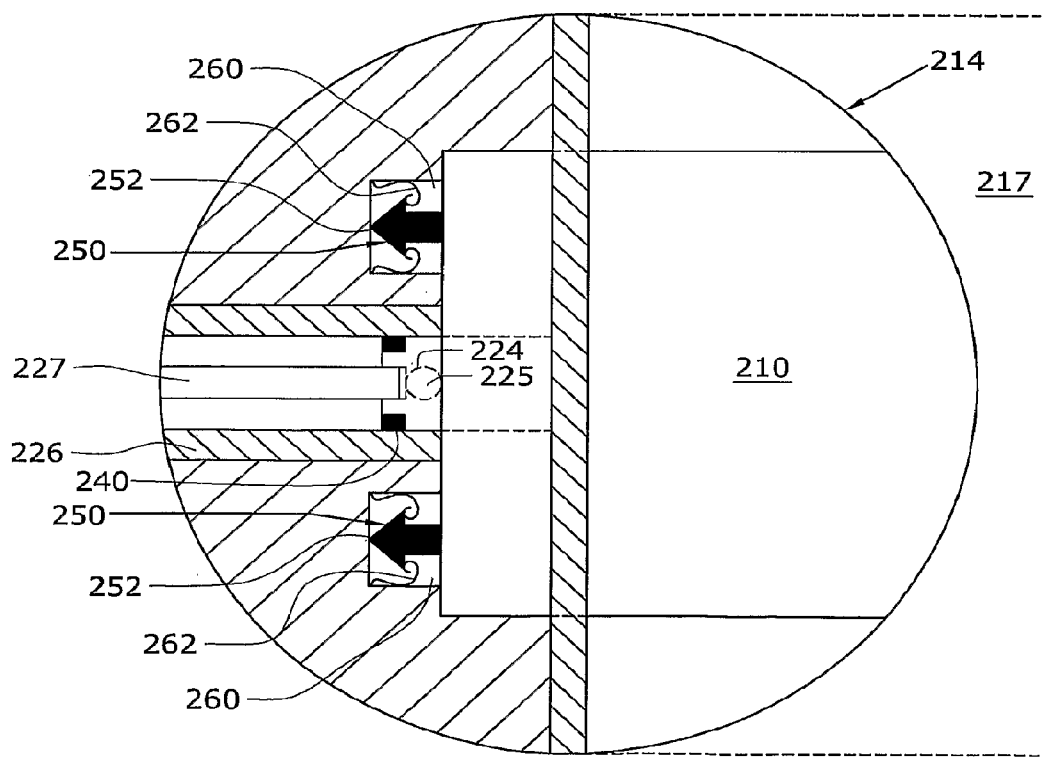
FIG. 5
FIG. 5B
FIG. 5A

SEPARABLE FUEL CARTRIDGE

CROSS-REFERENCE TO RELATED APPLICATIONS

The present application is a divisional application of U.S. patent application Ser. No. 11/996,042 filed on Jan. 17, 2008 which is a national stage application of international application PCT/US06/27318 filed on Jul. 14, 2006 which claims priority from provisional application 60/699,854 filed on Jul. 18, 2005. Each of the related applications is incorporated by reference herein in its entirety.

FIELD OF THE INVENTION

This invention generally relates to fuel cartridges for fuel cells, and more particularly this invention relates to disposable and refillable fuel cartridges.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell, and also has promising power application for consumer electronic devices. Solid oxide fuel cells (SOFC) convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Another fuel cell reaction for a metal hydride, such as sodium borohydride, reformer fuel cell is as follows:

$$NaBH_4 + 2H_2O \rightarrow (\text{heat or catalyst}) \rightarrow 4(H_2) + (NaBO_2)$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference.

In a direct borohydride fuel cell (DBFC), the reaction is as follows:

Half-reaction at the anode:

$$BH_4^- + 8OH^- \rightarrow BO_2^- + 6H_2O + 8e^-$$

Half-reaction at the cathode:

$$2O_2 + 4H_2O + 8e^- \rightarrow 8OH^-$$

One of the most important features for fuel cell application is fuel storage. Another important feature is to regulate the transport of fuel out of the fuel cartridge to the fuel cell. To be commercially useful, fuel cells such as DMFC systems should have the capability of storing sufficient fuel to satisfy the consumers' normal usage. For example, for mobile or cell phones, for notebook computers, and for personal digital assistants (PDAs), fuel cells need to power these devices for at least as long as the current batteries, and preferably much longer. Additionally, the fuel cells should have easily replaceable or refillable fuel tanks to minimize or obviate the need for lengthy recharges required by today's rechargeable batteries.

Given the portable nature of many of the devices capable of being powered by a fuel cell, the device or the fuel cartridge may be subjected to an unexpected impact load. In such a case, fuel may leak and damage sensitive electronics. Therefore, attempting to control the manner in which a fuel supply is separated from a fuel cell system upon an accidental impact is needed.

SUMMARY OF THE INVENTION

According to an aspect of the present invention, a fuel supply is attachable to a fuel cell system. The fuel supply includes a fuel supply connector configured to attach the fuel supply to the fuel cell system, means for automatically separating the fuel supply from the fuel cell system, and means for stopping the flow of fuel through the fuel supply connector.

According to another aspect of the present invention, a separation portion of a fuel supply connector is configured to break more readily upon impact than the remainder of the fuel supply connector.

According to yet another aspect of the present invention, a fuel supply ejection system is provided.

According to another aspect of the present invention, a slot in the fuel cell system is configured to slidably receive the fuel supply. A protrusion extends from a surface of the fuel supply, and a depression is defined on a wall of the slot, wherein the depression is configured to releasably receive the protrusion. A spring clip is disposed within the depression for releasably securing the protrusion therewithin.

According to another aspect of the present invention, a fuel supply includes a flexible fuel supply connector and a valve disposed within the connector.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is a schematic view of a fuel cell system and fuel supply according to the present invention;

FIG. 5 shows a schematic view of a second alternate embodiment of a fuel cell system and fuel supply according to the present invention; FIG. 5A is an enlarged, partial view of a connection area of the system and fuel supply of FIG. 5; FIG. 5B is an enlarged view of a weakened section of this embodiment;

DETAILED DESCRIPTION OF THE EMBODIMENTS

Figure 2C:
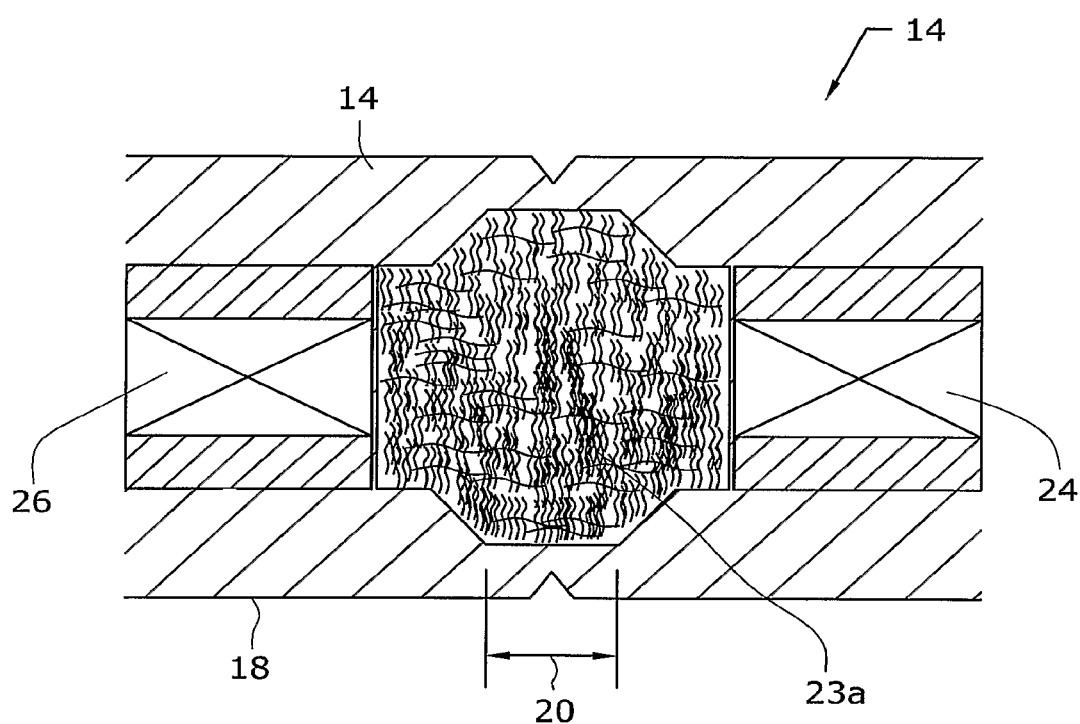
FIG. 2C shows a cross-sectional view of a third embodiment, FIGS. 2D(i)-(ii) are a cross-sectional view of a fourth embodiment.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell and reformat fuel cell, among others. The fuel supply may contain other types of fuel cell fuels, such as ethanol or other alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid-borne zinc particles immersed in a KOH electrolytic reaction solution, and the anodes within the cell cavities are particulate anodes formed of the zinc particles. KOH electrolytic solution is disclosed in United States Published Patent Application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a blend or mixture or methanol, sodium borohydride, an electrolyte and other compounds, such as those described in U.S. Pat. Nos. 6,554,877; 6,562,497 and 6,758,871, which are incorporated by reference in their entireties. Fuels also include those that are partially dissolved in solvent and partially suspended in solvent, described in U.S. Pat. No. 6,773,470 and those that include both liquid fuel and solid fuels, described in United States published Patent Application Number 2002/076602. These references are also incorporated by reference in their entireties.

Fuels also include metal hydrides, such as sodium borohydride ($NaBH_4$), and water, discussed above. Fuels further include hydrocarbon fuels, which include, but are not limited to, butane, kerosene, alcohol and natural gas, disclosed in United States published Patent Application No. 2003/0096150, entitled "Liquid Hereto-Interface Fuel Cell Device," published on May 22, 2003, which is incorporated herein by reference in its entirety. Fuels also include liquid oxidants that react with fuels. Fuels also include formic acid. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gasses, liquids, solids and/or chemicals and mixtures thereof.

The fuel supply of the present invention can also be used to store fuels that are not used in fuel cells. These applications include, but are not limited to, storing hydrocarbons and hydrogen fuels for micro gas-turbine engines built on silicon chips, discussed in "Here Come the Microengines," published in The Industrial Physicist (December 2001/January 2002), at pp. 20-25. Other applications include storing traditional fuels for internal combustion engines, and hydrocarbons, such as butane for pocket and utility lighters and liquid propane, as well as chemical fuels for use in personal portable heating devices. As used herein, the term "fuel cell" includes fuel cells as well as other machineries usable with the cartridges of the present invention.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel reservoirs, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies. The exemplary embodiments of the present invention are described herein as being connectable to a fuel cartridge. It is understood, however, that the present invention is suitable for use with any fuel supply, as defined above. Furthermore, as used herein, "fuel cell" includes an optional pump, which may reside within the electrical component that the fuel cell powers. The pump is also attachable to the fuel supply.

Furthermore, the shut-off valves or connecting valves discussed herein are suitable for communicating fuel from a fuel supply to a fuel cell and for communicating liquid and/or gas byproducts produced in the fuel cell back to the fuel supply or to a waste container. It is to be understood that the valves of the present invention are suitable for transporting fluids, i.e., liquid or gas, to and from the fuel supply, and/or to and from the fuel cell. Fuel cell cartridges and fuel cells are disclosed in commonly owned, co-pending published patent application US Pub. Pat. Appl. No. 2004/0151962, entitled, "Fuel Cartridge for Fuel Cells," filed on Jan. 31, 2003. The '962 published patent application is incorporated herein by reference in its entirety.

In accordance with an embodiment of the present invention as shown in FIG. 1, a fuel supply 10 is connected to a fuel cell system 12. A connection element 14 operatively attaches fuel supply 10 to fuel cell system 12 so that fuel contained within fuel supply 10 can be transferred between fuel supply 10 and fuel cell system 12 through a supply-side valve component 24 and a system-side valve component 26. Valve components 24 and 26 may be any valves known in the art, such as one-way valves, poppet valves or duckbill valves. Valve components 24 and 26 may also be separable shut-off valves such as those described in commonly-owned, co-pending U.S Pub. Pat. Appl. No. 2006/0071088, entitled "Valves for Fuel Cartridges," filed on Nov. 1, 2004, and U.S. Pub. Pat. Appl. No. 2005/0022883, entitled "Fuel Cartridge With Connecting Valve," filed on Jul. 29, 2003, the disclosures of which are incorporated herein by reference.

Connection element 14 is preferably a hollow tubular segment. Connection element 14 may be made of any material known in the art, but it is preferably made of a plastic or resin-based material, ceramic material or metal. The material of connection element 14 may be inert to the fuel stored in fuel supply 12, or connection element 14 may include an inner coating that is inert to the fuel stored in fuel supply 12.

Connection element 14 is configured such that if fuel supply 10 and/or fuel cell system 12 are subjected to a load, such as a twisting of one with respect to the other, or if fuel supply 10 and fuel cell system 12 is dropped, that fuel supply 10 may be automatically separated from fuel cell system 12 with a minimum loss of fuel. In one embodiment, as shown in FIG. 2A, connection element 14 is a rigid tubular element that includes a first thin-walled section 20 and a second thin-walled section 22. These weakened sections 20, 22 are configured such that connection element 14 is more likely to break apart at thin sections 20, 22 or at the notch(es) shown in FIG. 2A, if subjected to a load due to the structurally weaker walls of connection element 14 in these sections. The load at which sections 20, 22 will break is determined by the thickness of the walls in these sections 20, 22. Although shown as having similar thicknesses, sections 20, 22 may have walls of different thicknesses, such that one will break with a lesser impact or both will break with a greater impact. Additionally, as will be recognized by those of ordinary skill in the art, only one thin-walled section 20, 22 may be included with connection element 14. Also, weakened sections 20, 22 can be made from a different material than the rest of connection element 14, for example a more brittle material. In this embodiment, the separation of fuel supply 10 and fuel cell system 12 is permanent, i.e., fuel supply 10 will not be capable of being reattached due to the plastic deformation of connection element 14 at one or both of sections 20 and 22.

In order to minimize the loss of fuel from the system, connection element 14 includes at several locations fuel-stopping elements or fuel-absorbing elements 23a-d. Fuel-stopping elements 23a, 23b, 23c, 23d may be fibrous or filler material or valves (shown in FIG. 2C) that are configured to reduce the flow of fuel. Fuel-stopping elements 23a-d, such a fillers or open-cell foams, may have one or more holes therein to control permeability. Exemplary suitable materials include wicking or capillary materials disclosed in the '793 patent application, previously incorporated by reference. As shown in FIG. 3a, examples of valves appropriate for use as fuel-stopping elements 23a, 23b, 23c, 23d include a one-way valve 53a, such as duckbill valves, where the force from the flow of fuel normally holds the valve open. If the flow is interrupted, the valves will close. Any one-way flow valve can be used. Also shown in FIG. 3a is a check valve 53b, where a pin 55 or similar structure on one half of valve 53b pushes against a sealing body 56 on a second half of valve 53b to permit fluid to flow through the valve. If the valve is separated, then sealing body 56 is urged forward to shut off the fluid flow. Alternatively, check valve 53b could be used without a pin, if the force of the fluid flow is sufficient to hold open sealing body 56. In other words, fluid would flow through check valve 53b towards sealing body 56. As shown in FIG. 3b, another example of a valve appropriate for use as fuel-stopping means 23a, 23b, 23c, 23d is any of the separable valves 53c as shown and described in the '949 application, previously incorporated by reference. These valves generally include two halves, a first half 54a which could be located within first thin-walled section 20 or in second thin-walled section 22. However, only one thin-walled section is necessary. The second half 54b of a separable valve could be located in the thicker-walled portions of connection element 14 adjacent to section 20 or 22. When these two halves of a separable valve are separated, then fuel can no longer flow therethrough.

In another embodiment, as shown in FIG. 2B, connection element 14 includes a supply-side portion 14a and a system-side portion 14b connected at joint 17. Joint 17 is preferably a press-fit joint, such as a detent system as shown, but may also be any other type of non-permanent joint known in the art. A gasket 7, such as an o-ring, is also preferably used with joint 17 to assure a fluid-tight seal between portions 14a and 14b. The amount of overlap of portions 14a and 14b will dictate the amount of force necessary to cause a separation. In this embodiment, the separation need not be permanent, as in many cases portion 14a and 14b may simply be snapped back together. However, if subjected to a more severe impact, joint 17 may be irreparably damaged, depending on the type and direction of the load.

If subjected to a load, joint 17 is the most likely point of separation, thereby allowing fuel-stopping elements 23a and 23b, which may be filler or valves as described above, to minimize leakage of fuel. Also, in this embodiment, fuel-stopping elements 23a and 23b include holes 21 therethrough. Holes 21 allow for easier passage of the fuel through fuel-stopping elements 23a and 23b when fuel supply is still undamaged. Additionally, a wicking path 19 is included. Wicking path 19 is a portion of the material for use as fuel-stopping elements 23a and 23b that extends from the flow channel to an area outside of the flow channel. For example, as shown in FIG. 2a, wicking path 19 extends from the flow path through the housing of valve 26, and back to fuel supply 10. The fuel wicked through wicking path 19 may be diverted to any point within the fuel supply. For instance, in one embodiment, fuel supply 10 may include a hard outer casing, an inner flexible bladder containing the fuel, and a gap or space therebetween (not shown). Wicking path 19 may divert the fuel from the flow path to the gap or to the bladder.

Figure 3A:
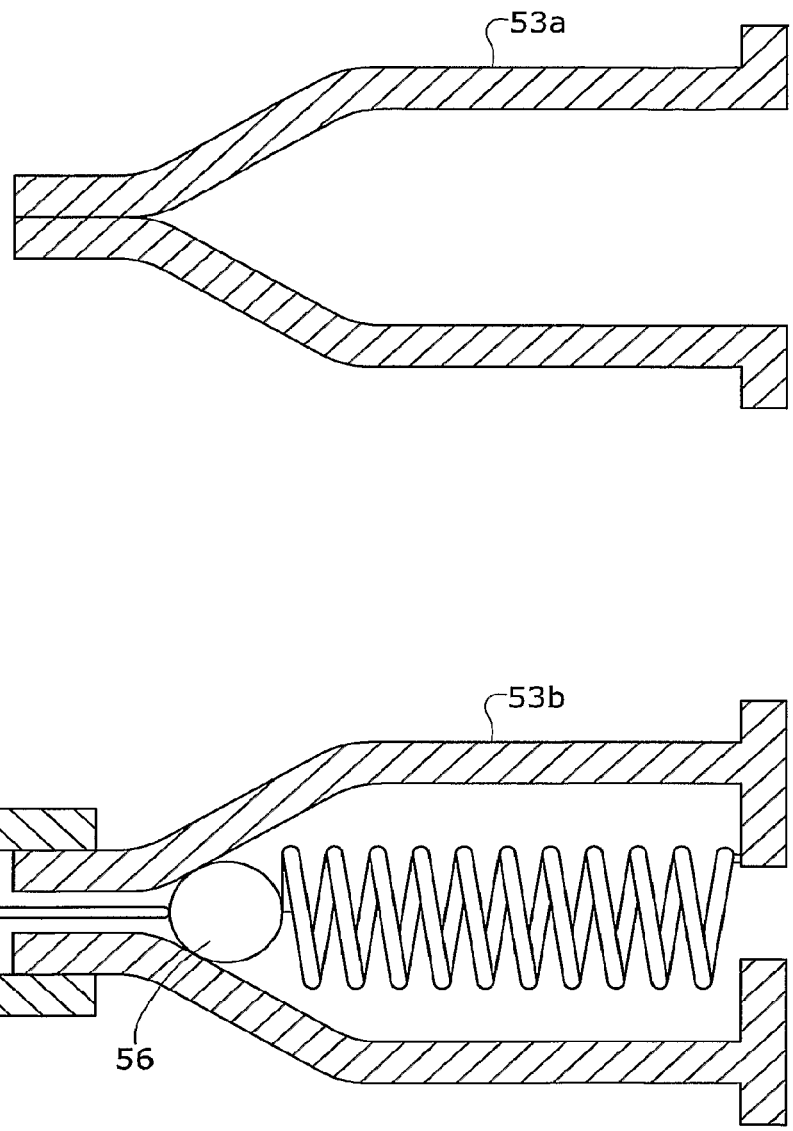
FIG. 3A shows cross-sectional views of valves used in the connectors of FIGS. 2a and 2b.
Figure 3B:
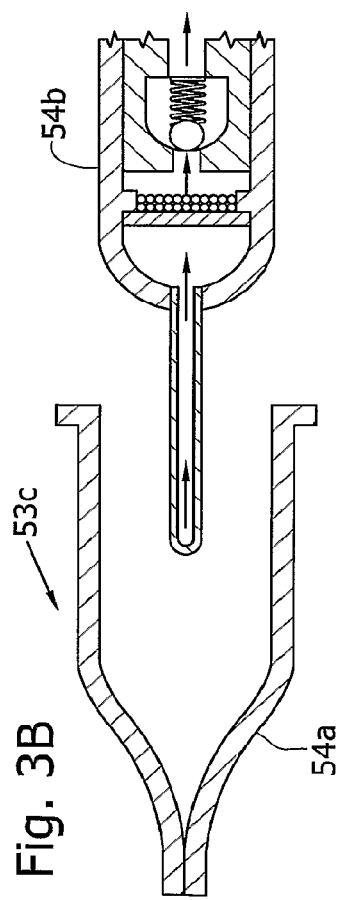
FIG. 3B shows cross-sectional views of a separable shut-off valve used in connectors of FIGS. 2A and 2B.

Another embodiment of connection element 14 is shown in FIG. 2C. Here, connection element 14 comprises a single weakened section 20 with an optional notch defined therein. Both valve components 24 and 26 are located proximate to each other to minimize the volume therebetween. Preferably, valve components 24 and 26 are located as close together as practicable. The space inside connection element 14 and between the two valve components are preferably filled with absorbent materials, such as 23a.

Figure 2D:
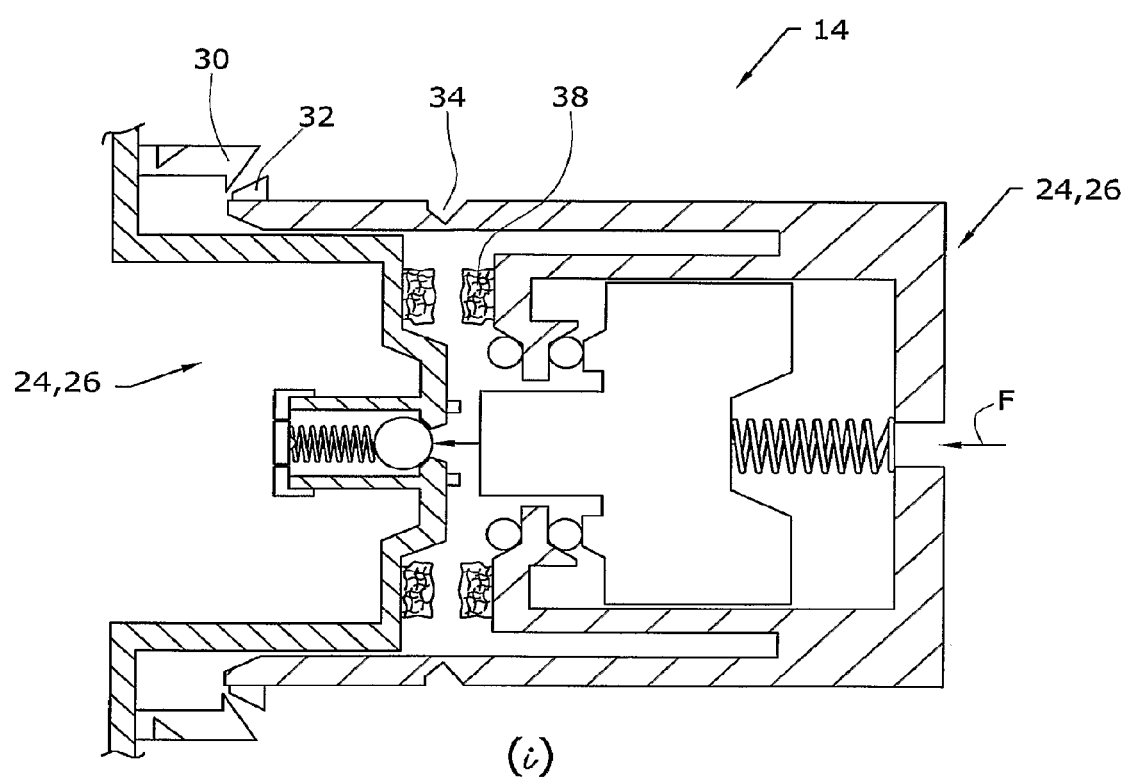
FIG. 2A shows a cross-sectional view of a first embodiment of a connector of FIG. 1.
FIG. 2B shows a cross-sectional view of a second embodiment of a connector of FIG. 1.

Another embodiment of connection 14 is shown in FIGS. 2D(i)-(ii), valve components 24 and 26 each contains a one-way check valve therein. Connection element 14 is a tubular sleeve that extends from one of the valve components. The other valve component has upstanding hooks 30, which are adapted to connect to hook 32 on the tubular sleeve/connection element 14. When engaged, hooks 30 and 32 retain the valve components to each other to establish flow path F, shown in FIG. 2D(ii). Tubular sleeve/connection element 14 preferably has at least one weakened section, e.g., notch 34, which may break upon impact. Optionally, hook 30 may also have a weakened section, e.g., notch 36, which may break upon impact. An advantage of this embodiment is that as connection element 14 (or hook 30) breaks, the internal seal provided by the check valve contained in each of the valve components seals the flow of fuel. Fuel absorbent materials 38 may be provided as shown to absorb residual fuel.

There are trade-offs that need to be considered in selecting connection element 14. In one example, a longer connection element, e.g., as shown in FIG. 2A, has relatively higher volume that may contain fuel. On the other hand, the weakened sections are well defined. In another example, a shorter connection element, e.g., as shown in FIG. 2C, has relatively less volume, but there are fewer weakened sections.

Figure 4A:
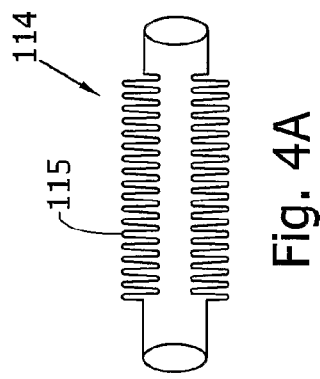
FIGS. 4 and 4A show a schematic view of an alternate embodiment of a fuel cell system and fuel supply according to the present invention.
Figure 4:
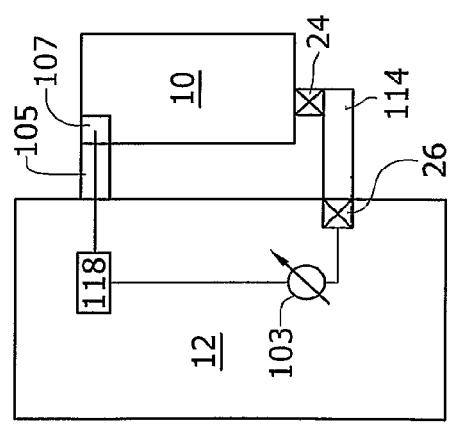

In yet another embodiment, as shown in FIG. 4, fuel supply 10 is operatively attached to fuel cell system 12 via a flexible connection element 114. Flexible connection element 114 operatively attaches fuel supply 10 to fuel cell system 12 so that fuel contained within fuel supply 10 can be transferred between fuel supply 10 and fuel cell system 12 through a supply-side valve component 24 and a system-side valve component 26, similar to those described above with respect to FIG. 1. Flexible connection element 114 is preferably a flexible tubular element made of any flexible material known in the art, such as rubber or thin-walled metals and plastics having smooth walls, such as is shown in FIG. 4, or corrugated walls, such as is shown in FIG. 4A. In this embodiment, connection element 114 is made to withstand a load, such as by twisting fuel supply 10 with respect to fuel cell system 12, or if fuel supply 10 and/or fuel cell system 12 is dropped. Additionally, connection element 114 may include a stretchable section 115 comprising a plurality of folds. In response to an impact, section 115 extends by opening the folds. An advantage of stretchable section 115 is that it yields to absorb some of the impact while maintaining a fluid seal. Connection element 114 can be a part of the fuel supply, or a part of the fuel cell or the device equipped with a fuel cell. Connection element can be a separate part and is connectable to both the fuel cartridge and the fuel cell/device.

Figure 2D:
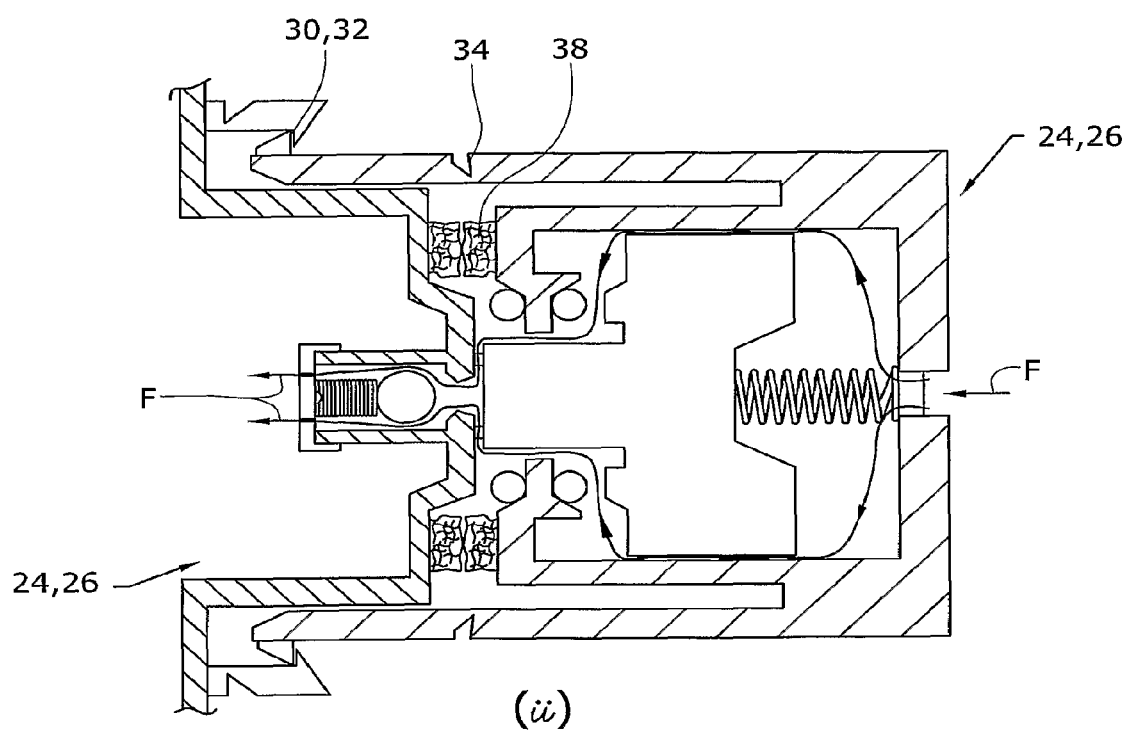

To support and stabilize the attachment of fuel supply 10 to fuel cell system 12, a second, rigid connection 105 is also preferably provided. Rigid connection 105 may be any type of attachment known in the art, such as a press-fit, releasable latch, or the like. Preferably, if rigid connection 105 is provided, no fuel is transferred between fuel supply 10 and fuel cell system 12 through rigid connection 105, although, as will be recognized by those in the art, rigid connection 105 may be made to mirror flexible connection 114 or a break-away rigid connection 14 as described above with respect to FIGS. 1 and 2.

Alternatively, rigid connection 105 may also include electrical leads linking a sensor 107 and a controller 118. Controller 118 may be any type of controller known in the art, such as a microprocessor or chip. Sensor 107 may be any type of sensor known in the art capable of detecting whether or not fuel supply 10 has suffered an impact, such as an accelerometer. One type of appropriate accelerometer is a piezoelectric sensor, which is a solid state element that produces an electrical charge when exposed to impacts. Additionally, the piezoelectric sensor can also be configured to measure a force or forces acting on the fuel supply or on the fuel cell system. If fuel supply 10 is dropped, sensor 107 would recognize the acceleration and signal controller 118 for action, such as shutting down a pump 103 that draws the fuel from fuel supply 10 into fuel cell system 12 or shutting down flow valves in the fuel supply or the fuel cell system. Suitable piezoelectric sensors are available from many sources, including PCB Piezotronics. Alternatively, electrical leads 113 may simply complete a circuit that allows pump 103 to run. If leads 113 are disconnected, i.e., if rigid connection 105 is broken due to impact forces, then the circuit completed by leads 113 is also broken, thereby shutting down pump 103.

Yet another embodiment of the present invention is shown in FIG. 5. In this embodiment, a fuel supply 210 is attached to a fuel cell system 212 by inserting at least a portion of fuel supply 210 into a connection area 214 of a housing 217 of fuel cell system 212. Housing 217 is preferably a plastic or metal housing of a device, such as a laptop computer or a PDA. Housing 217 also includes one or more fuel cell elements, such as a fuel cell stack (not shown).

As seen in FIG. 5A, connection area 214 is preferably a shallow slot-like opening of housing 217. Connection area 214 includes a system-side valve port 226 for receiving a supply-side valve 224 on fuel supply 210 for transferring fuel between fuel supply 210 and fuel cell system 212. Port 226 may simply be a receiving port for valve 224 or the supply-side half of a separable valve as described above and in the '949 application, previously incorporated herein by reference. Preferably, a gasket 240 such as an o-ring is positioned between port 226 and valve 224 to establish a fluid-tight seal. Valve 224 also preferably includes a floating portion for ease of self-alignment during the insertion process and also for impact absorption from side loads.

Fuel supply 210 is adapted to be inserted into connection area 214, such as by sliding, and held therewithin. Connection area 214 includes two depressions 260 having clips 262 disposed therewithin. Clips 262 may be any appropriate self-releasing clips known in the art, such as spring clips, side clips, air fittings, a collar with a deformable portion, weak magnets, or the like. Depressions 260 are configured to receive shafts 250 on fuel supply 210, which preferably includes caps 252 so that spring clips 262 may grasp onto caps 252 for a more secure hold. Caps 252 also preferably include a tapered portion as a lead in to pilot shafts 250 more readily into position. As connection area 214 is relatively shallow, fuel supply 210 may be pulled out of connection area 214. Due to the relatively small overlap of connection area 214 and fuel supply 210, the walls of connection area 214 will not inhibit the removal of fuel supply 210 or damage fuel supply 210 if any twisting or torquing occurs. Optionally, shafts 250 may be weakened near caps 252, e.g., with notches shown in FIG. 5B or by scoring, so that shafts 250 would break if exposed to side load forces. The spring constant of spring clips 262 is preferably chosen such that, if fuel supply 210 is subjected to a load, then fuel supply 210 may be ejected from connection area 214 with minimal damage to connection area 214 so that supply 210 may then be reinserted or a new fuel supply may be provided. In yet another embodiment, where the neck of shaft 250 is weakened, thin neck of 250 could be designed to break off so that another cartridge could not be inserted because a part of the shaft 250 is still in the fuel cell. Additionally, the force to release shafts 250 from clips 252 could be designed to release at a certain force that would not damage either valve 224 or fuel cell 212. Beyond that force, shafts 250 break and do not allow another cartridge 210 to be inserted into clips 252.

Furthermore, the separation of fuel supply 210 results in the separation of supply-side valve 224 from port 226 in such a manner as to prevent the further transfer of fuel between fuel supply 210 and fuel cell system 212. For example, in one embodiment, valve 224 may be a check valve, such as is shown in FIG. 3a. In such an embodiment, port 226 may include a hollow protrusion, pin or needle 227 that pushes open a sealing member in valve 224 to allow fuel to flow through valve 224 and into port 226. Upon separation, protrusion 227 is removed from valve 224, and the sealing member closes valve 224 thereby shutting off the flow of fuel. Even though connection area 214 is preferably shallow, the length of protrusion 227 may be selected such that the sealing member within valve 224 may be manipulated. In another embodiment, a separable shut-off valve, such as those described in the '949 and '006 applications, is used. In yet another embodiment, pin 227 may be positioned within valve 224, such as at or near the center thereof by ribs or other supports. Valve 224 is only open so long as pin 227 remains in the precise position determined by the supports. If pin 227 is moved from the precise position, such as due to an impact breaking one of the supports, pin 227 is no longer able to hold valve 224 open.

Figure 6:
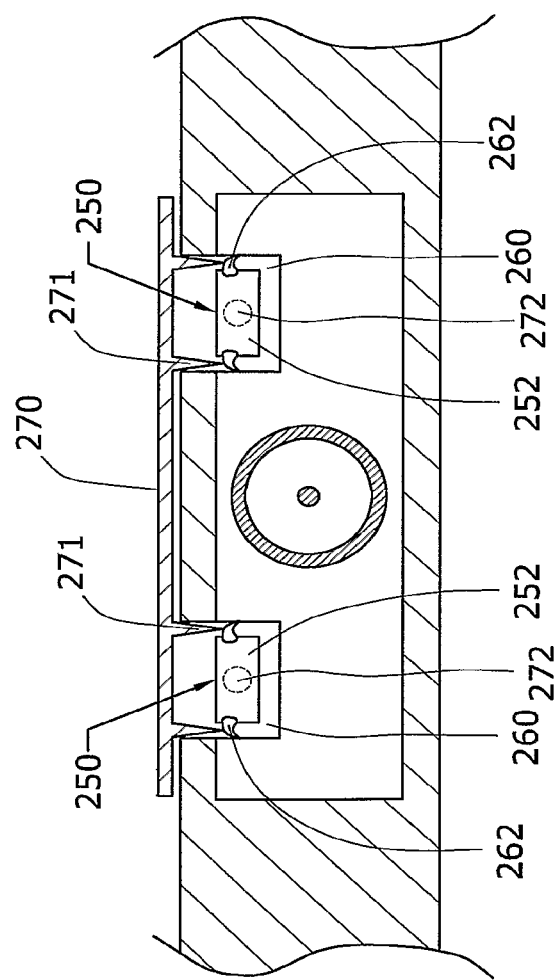
FIG. 6 is a cross-sectional view of the connection area of the fuel cell system and fuel supply of FIG. 5, taken along line A-A thereof, showing an alternate connection mechanism.

An alternate ejection system is shown in FIG. 6, which shows a cross-sectional view of the ejection system as taken along line A-A on FIG. 5. Fuel supply 210 is operatively connected to fuel cell system 212 in a similar manner as described with respect to FIGS. 5 and 5a. When fuel supply 210 is inserted into connection area 214, shafts 250 push against springs 272, which are configured to bias shafts 250 outward. Shafts 250 are held within openings 260 when spring clips 260 clip over caps 252. To eject fuel supply 210, a lever arm 270 attached to fuel supply 210 includes several protrusions 271 which extend into openings 260. Preferably, protrusions 271 are wedge-shaped, though they may have any other appropriate shape. If fuel supply 210 is impacted in such a way as to depress lever arm 270, protrusions 271 are forced into openings 260, between caps 252 and spring clips 262. As spring clips 262 are released, biasing springs 272 push shafts 250 outward, thereby ejecting fuel supply 210. As would be apparent to those in the art, the number of shaft 250 and clip 252 combinations may range from one to any number, depending upon the desired strength of the connection. Additionally, no separate shafts 250 are required if valve 224 is configured to be held in place by a clip 252 in the vicinity of the connection of valve 224 to fuel cell system 212. In other words, in one embodiment, valve 224 may be substituted for shaft 250.

Figure 7:
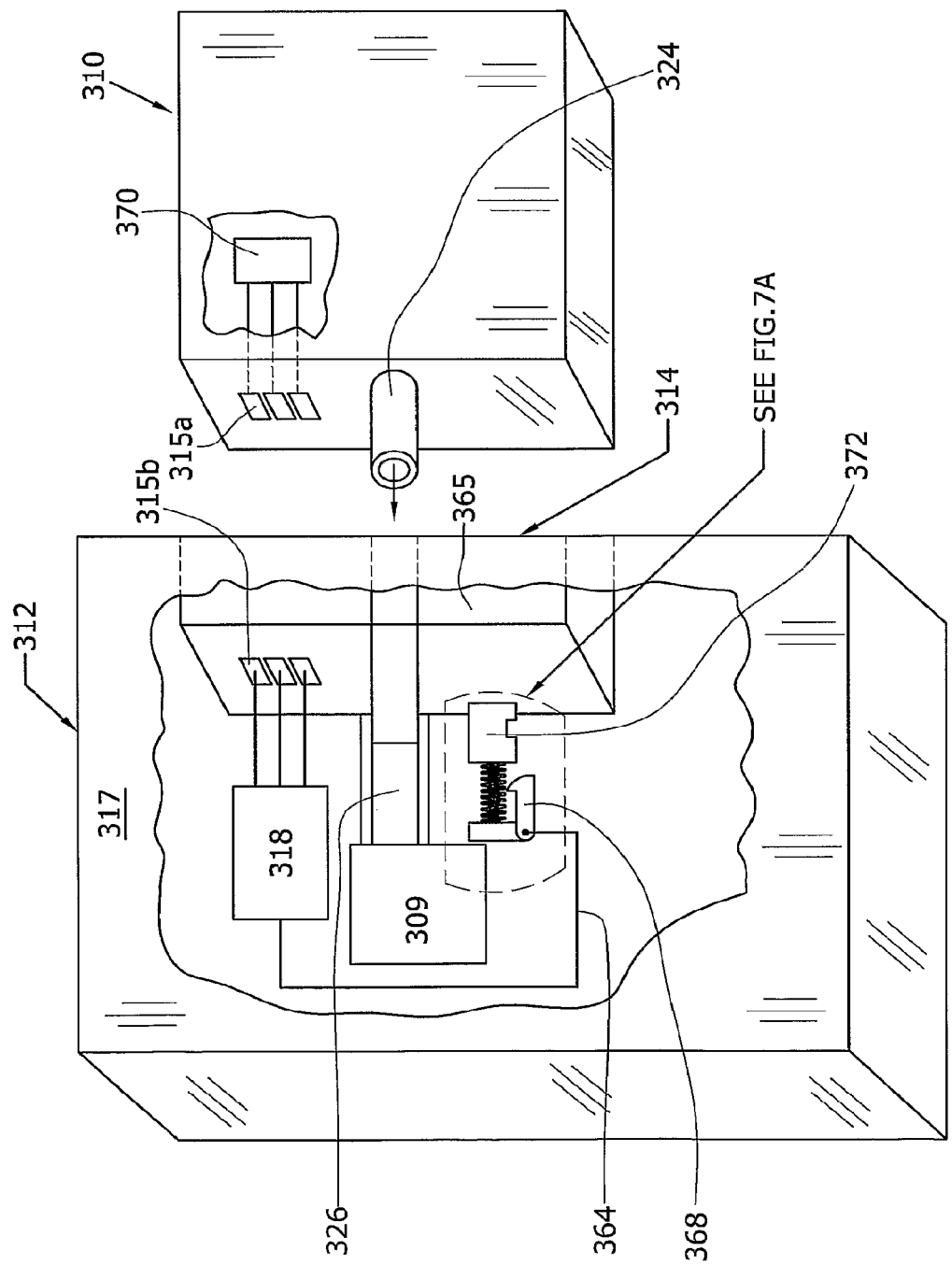
FIG. 7 shows a schematic view of a third alternate embodiment of a fuel cell system and fuel supply according to the present invention.

In yet another embodiment, as shown in FIG. 7, a fuel supply 310 is attached to a fuel cell system 312 by inserting fuel supply 310 into a connection area 314 on a fuel cell system housing 317, similar to the embodiment shown in FIG. 5. In this embodiment, fuel supply 310 includes a valve 324 configured to be operatively connected to a port 326 such that fuel can be transferred from fuel supply 310 to fuel cell stacks 309. Valve 324 and port 326 are similar to those described above with respect to FIG. 5.

Fuel supply 310 includes a sensor 370. Preferably, sensor 370 is an accelerometer, although sensor 370 may be any type of sensor known in the art that indicates a sudden acceleration or an impact, such as a strain gauge. Sensor 370 is preferably a piezoelectric accelerometer, which is known in the art. Piezoelectric accelerometers are generally a piezoelectric crystal such as quartz sandwiched between a center post and a seismic mass. Under acceleration, the mass causes a shear stress to be applied to the crystal. The magnitude of the voltage generated by this stress on the crystal corresponds to the amount of acceleration. Additionally, sensor 370 may also be a simple spring-mass accelerometer. Sensor 370 may also be located in fuel cell system 312.

Fuel cell system 312 includes an automatic ejection mechanism. When fuel supply 310 is pushed into connection area 314 of housing 317, this sliding action pushes a rod 372, shown in FIG. 7A, connected to a biasing spring 368 toward a stop 375 until a detent 365b is pushed into a corresponding slot 365a disposed in rod 372. In its neutral state, spring 368 is extended toward the exterior of housing 317; therefore, energy is stored within compressed spring 368.

Detent 365b is located at the end of a movable arm 374 which is attached to stop 375 by a hinge 376. Hinge 376, which may be any known in the art, is controlled by a controller 318. Controller 318, similar to controller 118 described above, may be any type of controller known in the art, such as a computer processor. Controller 318 communicates with movable arm 374 via a link 364. Controller 318 also communicates with sensor 370 on fuel supply 310 via electrical contacts 315a, 315b. Controller 318 is programmed to calculate the amount of acceleration of fuel supply 310 from the signals controller 318 receives from sensor 370. If the amount of acceleration exceeds a threshold level, controller 318 sends a signal to release arm 374 by opening the hinging mechanism using, for example, an electromagnet to pull movable arm 374 so that detent 365b is released from slot 365a. Alternatively, hinge 376 may be weak, so that the motion of the impact or acceleration itself may jar detent 365b loose from slot 365a. As movable arm 374 rotates open, detent 365b is removed from rod 372. Spring 368 releases its stored energy and pushes rod 372 outward, thereby ejecting fuel supply 310 from connection area 314. Spring 368 should be sufficiently strong to provide a rapid disengagement of fuel supply 310 from fuel cell 312. Valve 324 is separated from port 326, thereby stopping the flow of fuel. Alternatively, fuel supply 310 will not be able to be reinserted until controller 318 resets arm 374. It will be apparent to those of ordinary skill in the art that alternative, known ejection systems and configurations may also be used and controlled by controller 318.

Figure 7B:
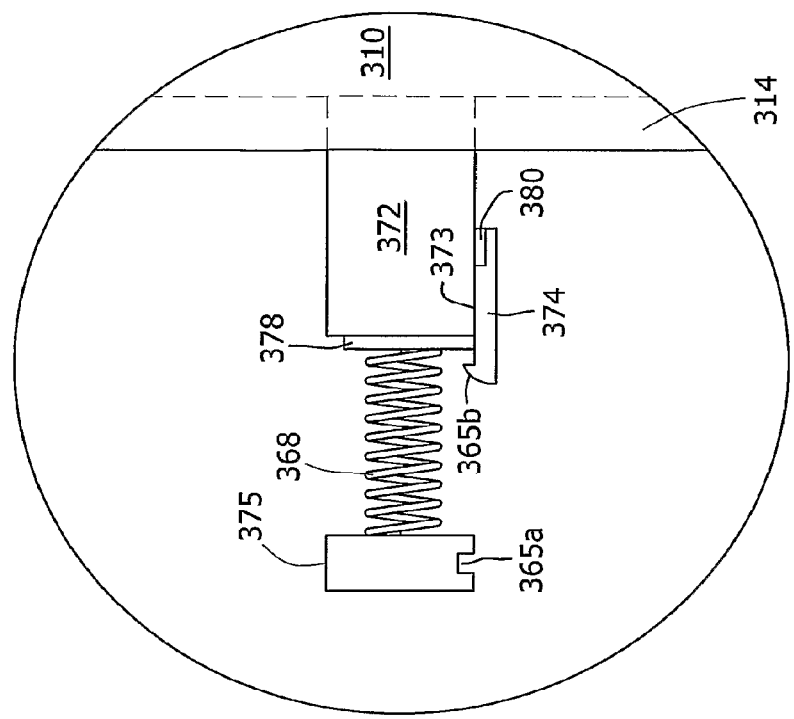
FIG. 7B is an enlarged partial view of an alternate embodiment of the connection area shown in FIG. 7A.
Figure 7A:
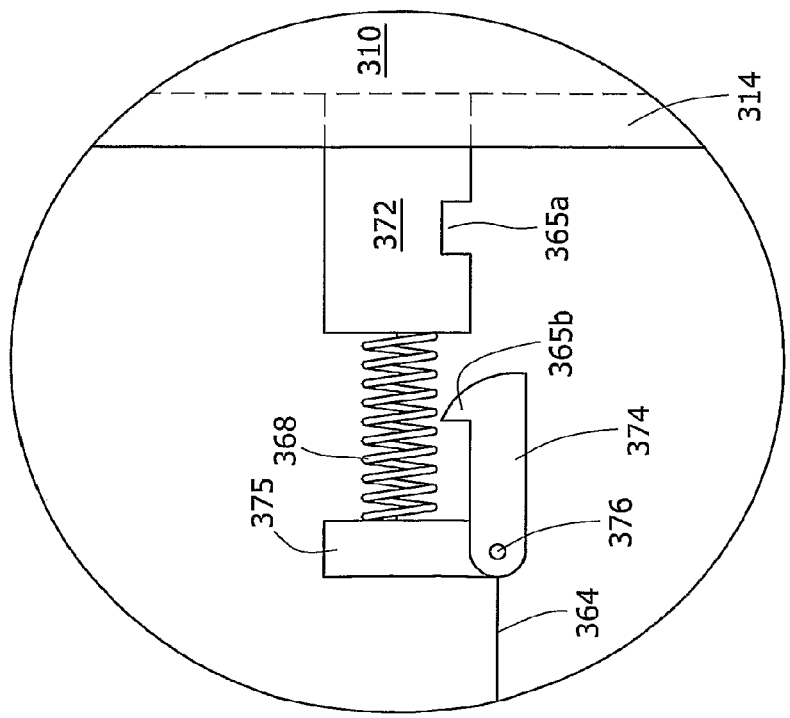
FIG. 7A is an enlarged, partial view of a connection area of the system and fuel supply of FIG. 7.

In an alternate ejection system, movable arm 374 may be located on fuel supply 310. Additionally, movable arm 374 may be actuated by any method known in the art. For example, an alternate embodiment of the ejection system is shown in FIG. 7B. In this embodiment, which is similar in most respects to the embodiment shown in FIG. 7, rod 372 is fixedly attached to fuel supply 310. In other words, rod 372 is an extension of fuel supply 310. A central portion 373 of movable arm 374 is fixedly attached to rod 372, such as with an adhesive or fasteners.

A free end of movable arm 374 is configured with a detent 365b which is insertable into corresponding notch 365a located on stop 375 on the fuel cell. Detent 365b is snapped into position within notch 365a when fuel supply 310 is properly inserted into connection area 314. As in the embodiment described above, spring 368 is attached to stop 375. In its neutral state, spring 368 is extended toward the exterior of housing 317; therefore, energy is stored within spring 368 as spring 368 is compressed toward stop 375 by the insertion of fuel supply 310 into connection area 314. Preferably, a plate 378, such as a metal or plastic plate, is disposed at the terminus of spring 368 so that spring 368 is evenly compressed. When movable arm 374 is actuated, detent 365b is released from notch 365a allowing spring 368 to push fuel supply 310 out of connection area 314.

In this embodiment, movable arm 374 is preferably made of an electroactive polymer (EAP) material. As is known in the art, EAPs respond to electrical stimulation by displaying a significant shape or size displacement; "artificial muscles" is a term often used to describe this aspect of EAPs. Any type of EAP may be used, including but not limited to ferroelectric polymers, electrostatically stricted polymers, electrostrictive graft elastomers, electro-viscoelastic elastomers, ionomeric polymer-metal composites, conductive polymers, and carbon nanotubes. As electricity is passed through movable arm 374, movable arm 374 deforms. The electricity to trigger the deformation may come from any source, such as a battery (not shown) whose current flow is controlled by controller 318. However, the electrical current to actuate movable arm 374 is preferably generated by a piezoelectric crystal 380 disposed in contact with movable arm 374. If piezoelectric crystal 380 is subjected to a load, such as from an acceleration or an impact, crystal 380 is squeezed between movable arm 374 and rod 372. As is known in the art, compressing or impacting a piezoelectric crystal such as crystal 380 generates a current on the surface thereof. This current actuates movable arm 374 away from notch 365a to allow spring 368 to eject fuel supply 310. As will be recognized by those of ordinary skill in the art, movable arm 374 made from an EAP may also be used in the embodiment shown in FIG. 7A, instead of a hinged, rigid arm. During the fuel supply insertion process, an electrical current can be sent by the host device to actuate arm 374. Arm 364 may be sufficiently pliable to bend during insertion.

Alternatively, keyhole connections may be used instead of detent system 365, so that rod 372 must follow a predetermined path for secure attachment. Either rod 372 or the keyhole portion must be rotated to permit detachment. Alternatively, the keyhole portion could be perforated so that a shaft thereof breaks off upon impact. Additionally, as will be apparent to those in the art, such an ejection system may be appropriate for use in a recess, as was discussed above, or simply at the surface of fuel cell system 312 if the connections are sufficiently supported to prevent accidental dislodgement at a force below a threshold level.

Alternatively, valve component 324 and/or 326 can be electrical solenoid valves that are controlled by controller 318. When the acceleration detected by sensor 370 exceeds a predetermined threshold, controller 318 sends an electrical signal or current to shut down one or both valve components 324, 326. Alternatively, both the solenoid valve 324, 326 and the ejection mechanism shown in FIG. 7A may be deployed together or in a predetermined sequence. Optionally, a pump (not shown) for drawing fuel from fuel supply 310 into fuel stacks 309 may be signaled by controller 318 to shut off. In this embodiment, the circuit providing the current to hold solenoid valve 324, 326 open is only completed when fuel supply 310 is properly inserted into connection area 324. Upon impact, fuel supply 310 is ejected, and the circuit controlling solenoid valve 324, 326 is broken, thereby shutting off the flow of fuel therethrough. Optionally, controller 318 may include a display so that a user may be advised to inspect all surfaces after an impact prior to attempting to insert a new fuel supply 310. Depending on the level of acceleration measured, controller 318 could keep all flow valves closed or could reject the re-insertion of the fuel supply or the insertion of a new fuel supply, if the acceleration exceeds a predetermined level.

Other suitable retention devices are disclosed in commonly owned U.S. Provisional Patent Application Ser. No. 60/699,685, entitled "Fuel Supply With Improved Connecting Valve," filed on Jul. 18, 2005, and is incorporated by reference herein in its entirety.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. A fuel cell system comprising:
a fuel cell;
a fuel supply to supply a liquid fuel to the fuel cell;
an accelerometer, wherein output from the accelerometer controls an element of the fuel supply or the fuel cell configured to stop a flow of the liquid fuel;
a fuel supply connector configured to attach the fuel supply to the fuel cell;
a fuel-absorbing element configured to reduce a leakage of the liquid fuel in response to a separation between the fuel cell and the fuel supply; and a retainer made from an electroactive polymer, wherein said retainer is configured to retain the fuel supply to the fuel cell system and actuatable by the output from the accelerometer;

wherein the output from the accelerometer ejects the fuel supply from the fuel cell system by actuating the retainer.

2. The fuel cell system of claim 1, wherein said element of the fuel supply or the fuel cell configured to stop the flow of the liquid fuel comprises a flow valve in the fuel supply.

3. The fuel supply of claim 2, wherein the valve is selected from the group consisting of a check valve, a duckbill valve, a solenoid valve and a separable shut-off valve.

4. The fuel cell system of claim 1, wherein said element of the fuel supply or the fuel cell configured to stop the flow of the liquid fuel comprises a flow valve in the fuel cell.

5. The fuel cell system of claim 1, further comprising a processor.

6. The fuel cell system of claim 1, wherein the electroactive polymer is selected from the group consisting of ferroelectric polymers, electrostatically stricted polymers, electrostrictive graft elastomers, electro-viscoelastic elastomers, ionomeric polymer-metal composites, conductive polymers, and carbon nanotubes.

7. The fuel cell system of claim 1, wherein the accelerometer is a piezoelectric accelerometer.

8. The fuel cell system of claim 1, wherein the accelerometer is a spring-mass accelerometer.

9. The fuel cell system of claim 1, further comprising:

a joint disposed between a fuel cell portion of the fuel supply connector and a fuel supply portion of the fuel supply connector, wherein the joint is configured to separate in response to a predetermined amount of force; and wherein the fuel absorbing element includes a first fuel absorbing element and a second fuel absorbing element, the first fuel absorbing element being disposed in the fuel cell portion of the fuel supply connector and the second fuel absorbing element being disposed in the fuel supply portion of the fuel supply connector.

10. A fuel cell system comprising:

a fuel cell;

a fuel supply to supply a liquid fuel to the fuel cell;

an accelerometer, wherein output from the accelerometer controls an element of the fuel supply or the fuel cell configured to stop a flow of the liquid fuel;

a fuel supply connector configured to attach the fuel supply to the fuel cell;

a fuel-absorbing element configured to reduce a leakage of the liquid fuel in response to a separation between the fuel cell and the fuel supply;

a fuel supply connection area disposed on the fuel cell system, wherein the fuel supply is configured to be inserted within the fuel supply connection area; and a fuel supply ejection system adapted to eject the fuel supply upon acceleration of the fuel supply;

wherein the fuel supply ejection system comprises an ejector for expelling the fuel supply from the system, wherein the ejector comprises an electroactive polymer actuator.

* * * * *